No. 668,664. Patented Feb. 26, 1901.
N. H. SUREN.
STORAGE BATTERY SYSTEM FOR SIGNALING CIRCUITS.
(Application filed June 19, 1899.)
(No Model.)
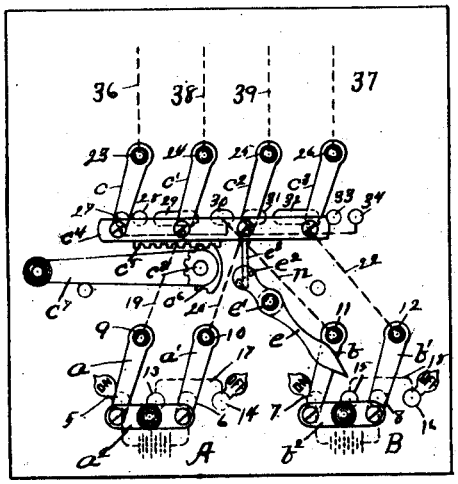
Fig.-1-
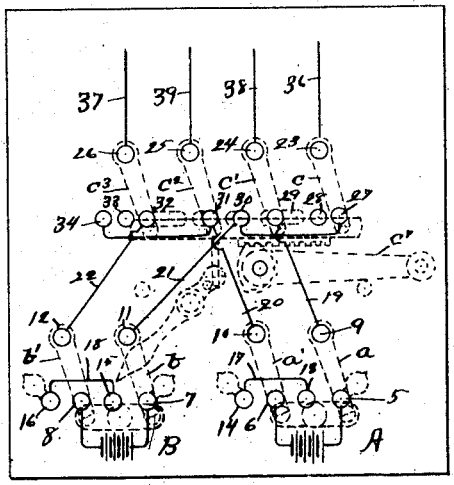
Fig.-2-
Witnesses:
H. B. Davis.
J. L. Hutchinson
Inventor:
Nathan H. Suren
By B. J. Hayes
atty.
THE NORRIS PETERS CO., PHOTO-LITHO., WASHINGTON, D. C.

UNITED STATES PATENT OFFICE.

NATHAN H. SUREN, OF NEEDHAM, MASSACHUSETTS.

STORAGE-BATTERY SYSTEM FOR SIGNALING-CIRCUITS.

SPECIFICATION forming part of Letters Patent No. 668,664, dated February 26, 1901.

Application filed June 19, 1899. Serial No. 721,150. (No model.)

*To all whom it may concern:*

Be it known that I, NATHAN H. SUREN, of Needham, county of Norfolk, and State of Massachusetts, have invented an Improvement in Storage-Battery Systems for Signaling-Circuits, of which the following description, in connection with the accompanying drawings, is a specification, like characters on the drawings representing like parts.

At the present time it is customary in many places to use storage batteries for fire-alarm and police-signal systems, and such storage batteries are charged at the proper times by a current from a suitable charging-line. It is very important when disconnecting the storage battery from the working or signaling circuit for the purpose of charging it that the continuity of said circuit shall not be interrupted, as any interruption in the working or signaling circuit will produce a blow on the bells and other apparatus connected with the system.

This invention has for its object to provide a working or signaling circuit with storage batteries and to provide means whereby the same may be disconnected from the working circuit without interrupting its continuity.

The invention comprehends the employment of two storage batteries, one or the other of which will be connected with the working or signaling circuit and the other with the charging-circuit, and a switch is provided which is so constructed and arranged that whenever it is operated the storage battery connected with the charging-circuit will first be disconnected therefrom, then said storage battery will be connected in parallel with the other storage battery in the working or signaling circuit, then the storage battery connected with the working or signaling circuit and which was supplying current thereto will be disconnected therefrom, leaving the other storage battery connected therewith, and, finally, said disconnected storage battery will be connected with the charging-line.

Figure 1 shows in front elevation means embodying this invention for connecting either one of two storage batteries to a working circuit and the other to a charging-circuit without interrupting the continuity of the working circuit, and Fig. 2 is a rear side view of the switchboard, showing the circuits.

A B represent two storage batteries which are provided for the working circuit, one of which will be connected with the working circuit while the other is connected with the charging-line and is being charged, and as herein shown the battery A is connected with the working circuit and the battery B is connected with the charging-line and is being charged.

5 6 represent the terminals of the battery A, and 7 8 the terminals of the battery B. A two-point switch is provided for connecting and disconnecting each battery independently, and $a\ a'$ represent the arms of the two-point switch of the battery A, and $b\ b'$ represent the arms of the two-point switch of the battery B.

The arms $a\ a'$ are connected together by a short plate $a^2$, bearing a knob for operating the switch, and the arms $b\ b'$ are likewise connected together by a plate $b^2$, bearing a knob for operating the switch.

The switch-arms $a\ a'$ are pivoted to the terminal points 9 10, and the switch-arms $b\ b'$ are pivoted to the terminal points 11 12. 13 14 represent another pair of terminal points for the two-point switch $a\ a'\ a^2$, and 15 16 represent another pair of terminal points for the two-point switch $b\ b'\ b^2$, and said terminals 13 14 are connected together by a wire 17, and said terminals 15 and 16 are connected together by a wire 18.

When the two-point switch $a\ a'\ a^2$ is in the position shown on the drawings, with its arms resting upon the terminals 5 6, the battery A will be connected with the wires 19 and 20, leading from the terminals 9 10; but when said switch is moved into its other position, with its arms resting upon the terminals 13 14, the battery A will be absolutely disconnected. When the two-point switch $b\ b'\ b^2$ is in the position shown in the drawings, with its arms resting upon the terminals 7 8, the battery B will be connected with the wires 21 22, leading from the terminals 11 12; but when said switch is moved into its other position, with its arms resting upon the terminals 15 16, the battery B will be absolutely disconnected. These two-point switches may or may not be used, but are provided in order that each battery may be disconnected whenever desired for the purpose of repairs, &c.

Whenever it is desired to switch one of the storage batteries out of circuit and the other into circuit for the purpose of enabling the battery switched out to be recharged, it is important that said operation shall be accomplished without opening the line or changing its normal condition, as for fire-alarm purposes any change in the normal condition of the circuit will produce or is liable to produce a blow on the bells, &c. A gang-switch is provided for thus switching the batteries into and out of circuit, which consists, essentially, of four arms $c\ c'\ c^2\ c^3$, pivoted, respectively, to the terminal points 23 24 25 26, and the outer or free ends of said arms are all connected together by a horizontally-arranged bar $c^4$, which is adapted to be moved longitudinally to in turn move all the arms at the same time to and fro on their pivots. The bar $c^4$ is herein shown as formed or provided with rack-teeth $c^5$, which are engaged by a pinion $c^6$, secured to a crank-handle $c^7$ and turning eccentrically upon the pivot-pin $c^8$. It will be seen that as the pinion is turned by the crank-handle the bar $c^4$ will be moved and all the switch-arms moved together. The several arms $c\ c'\ c^2\ c^3$ rest upon or coöperate with contact-plates 27 28 29 30 31 32 33 34, and the wires 19 20 are connected to the contact-plates 29 31, and the wires 21 22 are connected to the contact-plates 30 32. The switch-arms $c'\ c^2$ when resting upon the contact-plates 29 31 connect the terminals 24 25, to which the line-wires 38 39 are connected, with the wires 19 and 20, and thereby connect the battery A with the line. The switch-arms $c$ and $c^3$ when resting upon the contact-plates 27 32 connect the terminals 23 26, to which the charging-wires 36 37 are connected, with the wires 21 22, thereby connecting the battery B with the charging-line. Thus it will be seen that with the parts as shown in the drawings the battery B is being charged and the battery A supplying current to the line.

When the gang-switch is moved in a direction toward the right, Fig. 1, which is toward the left, Fig. 2, the arms $c'\ c^2$ will be moved onto the contact-plates 30 32, thereby connecting the wires 21 22 with the terminals 24 25, so that the battery B may supply current to the line, and at such time the arms $c\ c^3$ will be moved onto the contact-plates 29 34 and the charging-current from the line 36 37 will pass through the battery A. The contact-plates 29 30 31 32 are made more or less elongated and are located quite close together, and the arms $c'\ c^2$ are made wide enough so that when passing from one plate to another the working or signaling circuit will not be interrupted, as said arms will during a short interval of time bear upon all of said plates, and thereby connect both batteries in parallel with said working or signaling circuit.

The plates 28 and 33 are secured to the board between the other contact-plates, as shown, and are used merely for the purpose of providing an efficient bearing for the arms $c\ c^3$ as they pass from contact-plates 27 and 32 to 29 and 34, or vice versa, and when said arms $c$ and $c^3$ rest upon said contact-plates 28 33 the charging-current will be disconnected from the storage batteries. It is important that the charging-current should not pass into the working or signaling circuit.

The gang-switch thus described when operated performs the following functions or possesses the following capabilities, viz: Normally one of the storage batteries, as A, will be connected with the line, and the other, as B, will be connected with the charging-circuit, as shown on the drawings. As the switch is moved toward the right, Fig. 1, first, the storage battery B, which is connected with the charging-circuit, will be disconnected from said circuit, the arms $c\ c^3$ disengaging the contact-plates 27 32, yet the arms $c'\ c^2$ still remain in engagement with the contact-plates 29 31; second, said disconnected storage battery B will then be connected in parallel with the other storage battery A with the working or signaling circuit, the arm $c^2$ resting on both plates 31 and 32, the arm $c'$ resting on both plates 29 30, and the arms $c\ c^3$ still occupying positions between the plates 27 29 and 32 24; third, the storage battery A will then be disconnected from the working or signaling circuit, leaving the storage battery B connected with said circuit, the arms $c'\ c^2$ resting on the plates 30 32 and the arms $c\ c^3$ still occupying a position between the plates 27 29 and 32 34, and, fourth, the storage battery A will then be connected with the charging-circuit, the arms $c\ c^3$ resting upon the plates 29 34. These several operations will take place in succession and not simultaneously, although the gang-switch is moved by simply turning a single crank-arm.

A finger $e$ is pivoted at $e'$, which is adapted to be moved by the gang-switch to point to A or B as an index to indicate which battery is being charged, and, as herein shown, said finger has on it two rearwardly-projecting pins $e^2$, located side by side, which receive between them a pin $e^3$, projecting downward from the rod or bar $c^4$, said pin $e^3$ moving the finger $e$ as the bar is moved.

While I have herein shown but a single working or signaling circuit and a single charging-circuit, it is obvious that I may provide a number of working circuits and a number of charging-circuits connected with a single charging-line and a single gang-switch, such as herein shown, adapted to be operated by a single crank-arm to connect and disconnect the storage batteries simultaneously with all of said circuits.

I claim—

1. A working circuit, a charging-circuit, two storage batteries A and B, and switches for connecting either one of said storage batteries with the working circuit and the other with the charging-circuit without interrupting the continuity of the working circuit, consisting of two pairs of contacts 29, 31, and 30, 32, one pair for each pair of battery-wires, two pivoted switch-arms connected with the working circuit, each constructed and arranged to engage one of the contacts of either pair and also one of the contacts of both pairs when moving from one to the other, two contacts 27, 34, each connected to one of the contacts, as 30, 31, of the aforesaid pairs of contacts, and two pivoted switch-arms connected with the charging-circuit constructed and arranged to engage said contacts 27, 34, and also one of the contacts, as 29, 32, of the aforesaid pairs of contacts, substantially as described.

2. A working circuit, a charging-circuit, two storage batteries A and B, and switches for connecting either one of said storage batteries with the working circuit and the other with the charging-circuit without interrupting the continuity of the working circuit, consisting of two pairs of contacts 29, 31, and 30, 32, one pair for each pair of battery-wires, two pivoted switch-arms connected with the working circuit, each constructed and arranged to engage one of the contacts of either pair and also one of the contacts of both pairs when moving from one to the other, two contacts 27, 34, each connected to one of the contacts, as 30, 31, of the aforesaid pairs of contacts, and two pivoted switch-arms connected with the charging-circuit constructed and arranged to engage said contacts 27, 34, and also one of the contacts, as 29, 32, of the aforesaid pairs of contacts, and means for moving all of said switch-arms simultaneously, substantially as described.

3. A working circuit, a charging-circuit, two storage batteries A and B, and switches for connecting either one of said storage batteries with the working circuit and the other with the charging-circuit without interrupting the continuity of the working circuit, consisting of two pairs of contacts 29, 31, and 30 32, one pair for each pair of battery-wires, two pivoted switch-arms connected with the working circuit, each constructed and arranged to engage one of the contacts of either pair and also one of the contacts of both pairs when moving from one to the other, two contacts 27, 34, each connected to one of the contacts, as 30, 31, of the aforesaid pairs of contacts, and two pivoted switch-arms connected with the charging-circuit constructed and arranged to engage said contacts 27, 34, and also one of the contacts, as 29, 32, of the aforesaid pairs of contacts, and to open said charging-circuit when moving from one to the other contact with which they coöperate, substantially as described.

4. A working circuit, a charging-circuit, two storage batteries A and B, and switches for connecting either one of said storage batteries with the working circuit and the other with the charging-circuit without interrupting the continuity of the working circuit, consisting of two pairs of contacts 29, 31, and 30, 32, one pair for each pair of battery-wires, two pivoted switch-arms connected with the working circuit, each constructed and arranged to engage one of the contacts of either pair and also one of the contacts of both pairs when moving from one to the other, two contacts 27, 34, each connected to one of the contacts, as 30, 31, of the aforesaid pairs of contacts, and two pivoted switch-arms connected with the charging-circuit constructed and arranged to engage said contacts 27, 34, and also one of the contacts, as 29, 32, of the aforesaid pairs of contacts, means for moving all of said switch-arms simultaneously, a finger operating with said switches and an index with which it coöperates, substantially as described.

5. A working circuit, a charging-circuit, two storage batteries A and B, and switches for connecting either one of said storage batteries with the working circuit and the other with the charging-circuit without interrupting the continuity of the working circuit, consisting of two pairs of contacts 29, 31, and 30, 32, one pair for each pair of battery-wires, two pivoted switch-arms connected with the working circuit, each constructed and arranged to engage one of the contacts of either pair and also one of the contacts of both pairs when moving from one to the other, two contacts 27, 34, each connected to one of the contacts, as 30, 31, of the aforesaid pairs of contacts, and two pivoted switch-arms connected with the charging-circuit constructed and arranged to engage said contacts 27, 34, and also one of the contacts, as 29, 32, of the aforesaid pairs of contacts, and a switch for connecting each storage battery with its contacts, substantially as described.

6. A working circuit, a charging-circuit, two storage batteries A and B, and two pairs of switch-arms, one pair, as $c'$, $c^2$, connected with the working circuit and the other pair, as $c$, $c^3$, connected with the charging-circuit, two contacts for each switch-arm $c'$, $c^2$, which are connected with the battery-wires, and one contact, as 27, 34, for each switch-arm $c$, $c^3$, located beside the aforesaid contacts so that said switch-arms $c$, $c^3$, may respectively engage said contacts 27, 34, or one of the aforesaid contacts which is connected with the battery-wires, and wires connecting the contacts not engaged by said switch-arms $c$, $c^3$, with said contacts 27, 34, substantially as described.

In testimony whereof I have signed my name to this specification in the presence of two subscribing witnesses.

NATHAN H. SUREN.

Witnesses:
  B. J. NOYES,
  J. L. HUTCHINSON.